United States Patent
Juan Jover et al.

(10) Patent No.: US 10,647,059 B2
(45) Date of Patent: May 12, 2020

(54) GENERATING A THREE-DIMENSIONAL OBJECT

(71) Applicant: Hewlett-Packard Development Company, L.P., Spring, TX (US)

(72) Inventors: Fernando Juan Jover, Viladecavalls (ES); Alejandro Manuel de Pena, Sant Cugat del Valles (ES); Esteve Comas Cespedes, Sant Quirze del Valles (ES); Edward Dale Davis, Poway, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 634 days.

(21) Appl. No.: 14/787,692

(22) PCT Filed: Jan. 31, 2014

(86) PCT No.: PCT/EP2014/051938
§ 371 (c)(1),
(2) Date: Oct. 28, 2015

(87) PCT Pub. No.: WO2015/106832
PCT Pub. Date: Jul. 23, 2015

(65) Prior Publication Data
US 2016/0151973 A1    Jun. 2, 2016

(30) Foreign Application Priority Data

Jan. 16, 2014 (WO) .................. PCT/EP2014/050841

(51) Int. Cl.
*B29C 64/386* (2017.01)
*B29C 64/35* (2017.01)
(Continued)

(52) U.S. Cl.
CPC .......... *B29C 64/386* (2017.08); *B29C 64/165* (2017.08); *B29C 64/35* (2017.08);
(Continued)

(58) Field of Classification Search
CPC ................................................... B29C 64/386
See application file for complete search history.

(56) References Cited

U.S. PATENT DOCUMENTS

| 8,021,139 B2 | 9/2011 | Kumagai et al. |
| 2002/0105114 A1 | 8/2002 | Kubo et al. |

(Continued)

FOREIGN PATENT DOCUMENTS

| EP | 1872928 | 1/2008 |
| WO | WO-95/34468 | 12/1995 |
| WO | WO-2005/007390 | 1/2005 |

OTHER PUBLICATIONS

Rajon, D.A. et al,; "An Investigation of the Potential of Rapid Prototyping Technology for Image-guided Surgery"; Jul. 13, 2006; 15 pages.

(Continued)

*Primary Examiner* — Larry W Thrower
(74) *Attorney, Agent, or Firm* — HP, Inc. Patent Department

(57) ABSTRACT

According to one example, there is provided apparatus for generating a three-dimensional object. The apparatus comprises a build material distributor movable bi-directionally in a first axis to deposit successive layers of a build material on a support, and an agent distributor movable bi-directionally in a second axis different to the first axis to deliver an agent onto selected portions of successive layers of build material.

12 Claims, 13 Drawing Sheets

(51) Int. Cl.
   *B29C 64/165* (2017.01)
   *B29C 64/40* (2017.01)
   *B33Y 10/00* (2015.01)
   *B33Y 30/00* (2015.01)
   *B33Y 50/02* (2015.01)
   *B29K 105/00* (2006.01)

(52) U.S. Cl.
   CPC ...... *B29C 64/40* (2017.08); *B29K 2105/0058* (2013.01); *B29K 2105/251* (2013.01); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 2005/0061241 A1* | 3/2005 | West | A61L 2/10 118/620 |
| 2005/0280185 A1 | 12/2005 | Russell et al. | |
| 2011/0147993 A1 | 6/2011 | Eshed et al. | |
| 2012/0156516 A1 | 6/2012 | Matsui et al. | |

OTHER PUBLICATIONS

The International Search Report and Written Opinion for International application No. PCT/EP2014/051938 dated Sep. 30, 2014 (12 pages).

\* cited by examiner

GENERATING A THREE-DIMENSIONAL OBJECT

BACKGROUND

Additive manufacturing systems that generate three-dimensional objects on a layer-by-layer basis have been proposed as a potentially convenient way to produce three-dimensional objects in small quantities.

The time to produce a three-dimensional object using such systems is related to the speed at which each layer of build material may be delivered and selectively solidified.

BRIEF DESCRIPTION

Examples will now be described, by way of non-limiting example only, with reference to the accompanying drawings, in which.

DETAILED DESCRIPTION

Some additive manufacturing systems generate a three-dimensional object through the selective solidification of successive layers of a build material, such as a powdered build material. Some such systems may solidify portions of a build material by selectively delivering an agent to a layer of build material. Some systems, for example, may use a liquid binder agent to chemically solidify build material. Other systems, for example, may use liquid energy absorbing agents, or coalescing agents, that cause build material to solidify when suitable energy, such as infra-red energy, is applied.

The production of a three-dimensional object through the selective solidification of successive layers of build material may involve a number of separate processes. One process may, for example, be to provide a layer of build material from which a layer of the three-dimensional object is to be generated. Another process may, for example, be to selectively deliver one or multiple agents to selected portions of a layer of build material. In some examples, an additional process may be to supply energy to build material on which an agent has been delivered.

Repetition of these processes enables a three-dimensional object to be generated layer-by-layer, through selective solidification of portions of successive layers of build material.

The delivery of agents to selected portions of a layer of build material may be performed by an agent distributor. In one example an agent distributor may be a printhead, such as thermal or a piezo printhead. Such printheads may be the same or similar to those used in inkjet printing systems. In other examples an agent distributor may be a spray nozzle or an array of spray nozzles.

Figure 1:
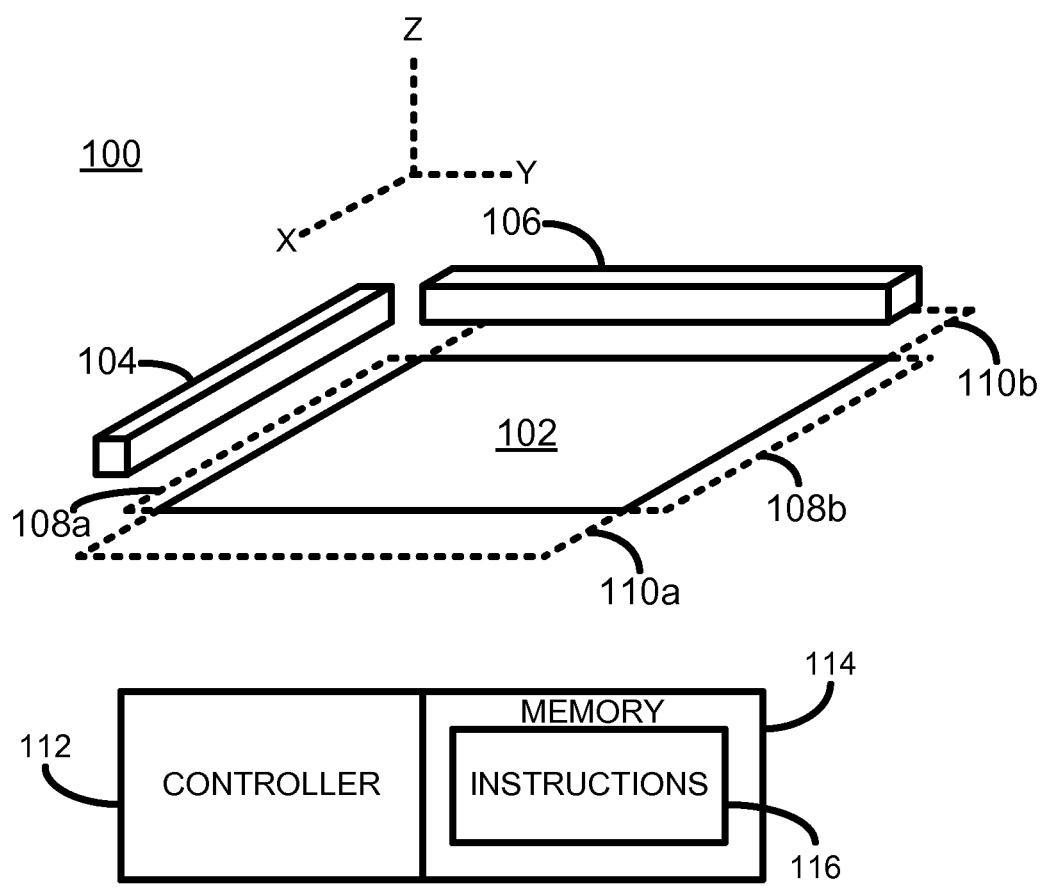
FIG. 1 is a simplified isometric illustration of a portion of an additive manufacturing system according to one example.

Referring now to FIG. 1 there is shown a simplified isometric illustration of a portion of an additive manufacturing system 100 according to one example. It will be appreciated that, for reasons of clarity of explanation, not all elements of a complete additive manufacturing system are shown.

The system 100 comprises a support member 102 which supports successive layers of build material that may be deposited by a build material distributor 104. In one example the support 102 is movable in the z-axis, for example to enable it to be lowered each time a new layer of build material is to be deposited. In one example the build material distributor may comprise a roller. In other examples the build material distributor may comprise a wiper blade. Build material may be supplied to the build material distributor 104 from a hopper or build material store (not shown).

The build material distributor 104 is movable bi-directionally along a first axis such that it may deposit a layer of build material whilst moving in either direction. As shown in FIG. 1, the first axis may be the y-axis. Although not shown in FIG. 1, the build material distributor 104 may, in one example, be mounted or be mountable on a moveable carriage or gantry.

The build material distributor 104 may deposit a first layer of build material directly on the support 102, and may deposit subsequent layers of build material on a previously deposited layer of build material. In one example the thickness of the layer of build material deposited by the build material distributor 104 is in the range of about 90 to 110 microns, although in other examples thinner or thicker layers of build material may be provided.

When the build material distributor 104 is not depositing build material it may be positioned, or parked, in a build material distributor parking position above a parking zone. In FIG. 1 a first build material distributor parking zone 108a is provided adjacent to the left-hand most edge (as shown in FIG. 1) of the support 102, and a second build material distributor parking zone 108b is provided adjacent to the right-hand most edge of the support 102. In other examples, however, only a single build material distributor parking zone may be provided.

When the build material distributor 104 is positioned in a parking position it does not hinder movement of the agent distributor 106 along its axis of travel (i.e. the x-axis as shown in FIG. 1)

The system 100 further comprises an agent distributor 106 such as a printhead comprising an array of printhead nozzles, or an array of printheads each comprising an array of printhead nozzles. In one example the agent distributor 106 may selectively deliver drops of a liquid binder agent to one or multiple portions of a layer of build material. In other examples the agent distributor 106 may selectively deliver drops of a coalescing agent. The agent distributor 106 may be controlled by a controller 112 to deliver drops of agent in accordance with a pattern defined by agent control delivery data. The controller may obtain agent control delivery data, for example, from a three-dimensional object processing system. The agent distributor 106 may include a supply of agent, or may be connectable to a separate supply of agent, for example from a separate agent tank or agent container.

The agent distributor 106 is movable bi-directionally along a second axis such that it may selectively deposit agent on portions of a layer of deposited build material whilst moving in either direction. As shown in FIG. 1, the second axis may be the x-axis. In one example the first and second axis may be orthogonal to each other. In another example the first and second axis may be arranged in an oblique configuration.

Although not shown in FIG. 1, the agent distributor 104 may, in one example, be mounted or be mountable on a moveable carriage or gantry. In one example the agent distributor 104 may be removably insertable into a suitable agent distributor receiver or interface module (not shown).

When the agent distributor 106 is not delivering agent it may be positioned in a parking position above a parking zone. In FIG. 1 a first agent distributor parking zone 110a is provided adjacent to the upper-most (as shown in FIG. 1) edge of the support 102, and a second agent distributor parking zone 110b is provided adjacent to the lower-most edge of the support 102. In other examples, however, only a single agent distributor parking zone may be provided. However, providing a parking zone at each end of the support 102 removes the need for the agent distributor 106 to return to a single parking zone after each operation, which helps reduce the time taken to produce each layer of a three-dimensional object.

When the agent distributor 106 is positioned in a parking position it does not hinder movement of the build material distributor 104 along its axis of travel (i.e. the y-axis as shown in FIG. 1)

Enabling the build material distributor 104 to be moveable along a first axis and the agent distributor 106 to be movable along a second axis may help increase the efficiency of such an additive manufacturing systems. For example, it may enable the build material distributor 104 to deposit build material whilst moving in either direction along its axis and may also enable the agent distributor 104 to deliver agent to build material whilst moving in either direction along its axis. Such a system may, for example, help reduce the delay between depositing a layer of build material and depositing agent on a layer of build material.

Additionally, when the agent distributor 106 is positioned in a parking position maintenance operations may be performed on the agent distributor 106 whilst the build material distributor 106 is depositing a layer of build material. If the agent distributor 106 comprises a printhead maintenance operations may have to be intermittently performed on the printhead.

Maintenance operations that may be performed on the agent distributor 106 may include, for example, printhead nozzle cleaning operations such as nozzle wiping, spitting, purging, and the like. Some maintenance operations may be performed at regular intervals. Some maintenance operations may be performed after a predetermined condition has been met, for example after a predetermine length of time, after a predetermined amount of agent has been delivered, when a new supply of agent is installed, etc. Some maintenance operations may be performed upon detection of a problem or potential problem, such as upon detection that a printhead nozzle has become blocked, upon detection that a printhead nozzle is not firing as intended, etc.

Similar maintenance operations may have to be performed on other types of agent distributors, such as spray nozzles.

In one example, a parking position is located above a service element (not shown), such as a spittoon, which enables the agent distributor 106 to be controlled to perform a service operation such as spitting or purging.

In another example, a parking position is located above a service element such as an agent distributor service station (not shown). The agent distributor 106 may thus have a maintenance operation performed thereon by the service station. Such a maintenance operation may include, for example, a physical wiping operation of printhead nozzles, capping of printhead nozzles, and the like. In one example the agent distributor 106 may be controlled to perform a spitting or purging operation whilst a maintenance operation is being performed by the service station.

The example shown in FIG. 1 may be used in an additive manufacturing system that uses a powder-based build material and a liquid binder agent.

The system controller 112 controls the general operation of the additive manufacturing system 100 as described further. In the example shown in FIG. 1 the controller 112 is a microprocessor-based controller that is coupled to a memory 114, for example via a communications bus (not shown). The memory stores processor executable instructions 116. The controller 112 may execute the instructions 116 and hence control operation of the system 100 in accordance with those instructions.

Figure 2:
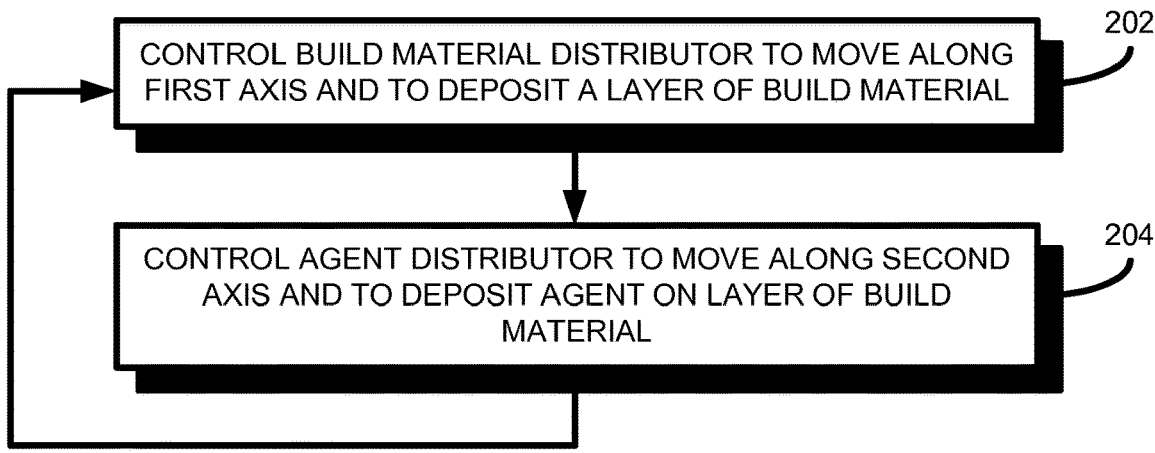
FIG. 2 is a flow diagram outlining a method of controlling an additive manufacturing system according to one example.

An example method of operating the system 100 of FIG. 1 to generate a three-dimensional object will now be described with additional reference to the flow diagram of FIG. 2.

At block 202 the controller 112 controls the build material distributor 104 to move along a first axis (i.e. the y-axis as shown in FIG. 1) and to deposit a layer of build material. The layer of build material will be deposited directly on the support 102 if it is the first layer of build material to be deposited, or will be deposited on a previously deposited layer of build material if it is not the first layer. The controller 112 controls the build material distributor 104 to be positioned in a parking position (108a or 108b) once a layer of build material has been deposited. In one example the build material distributor 104 will be positioned in a parking position situated at the end of its course of travel, in other words without the build material distributor having to return to its initial starting position. Where the build material distributor 104 is mounted on a carriage, the controller 112 indirectly controls the build material distributor 104 to move along the first axis by controlling the carriage on which it is mounted.

At block 204 the controller 112 controls the agent distributor 106 to move along a second axis (i.e. the x-axis as shown in FIG. 1) and to deposit agent on selected portions of the layer of deposited build material. The controller 112 controls the agent distributor 106 to be positioned in a parking position once the agent distributor has delivered agent to selected portions of a layer of build material. In one example the agent distributor 106 will be positioned in a parking position (110a or 110b) situated at the end of its course of travel, in other words without the agent distributor 106 having to return to its initial starting position. Where the agent distributor 106 is mounted on a carriage, the controller 112 indirectly controls the agent distributor 106 to move along the second axis by controlling the carriage on which it is mounted.

For example, the controller 112 may control the build material distributor to deposit a first layer of build material whilst moving in a first direction along the first axis. The controller 112 may then control the agent distributor to deliver agent to selected portions of the deposited layer of build material whilst moving in a second direction along the second axis. The controller 112 may then control the build material distributor to deposit a further layer of build material whilst moving in a direction opposite to the first direction. The controller 112 may then control the agent distributor to deliver agent to selected portions of the deposited layer of build material whilst moving in a direction opposite to the second direction.

The controller 112 repeats the blocks 202 and 204 as necessary to generate a three-dimensional object. For example, the controller 112 may control the operation of the system 100 in accordance with data defining slices of a three-dimensional object to be generated.

Figure 3:
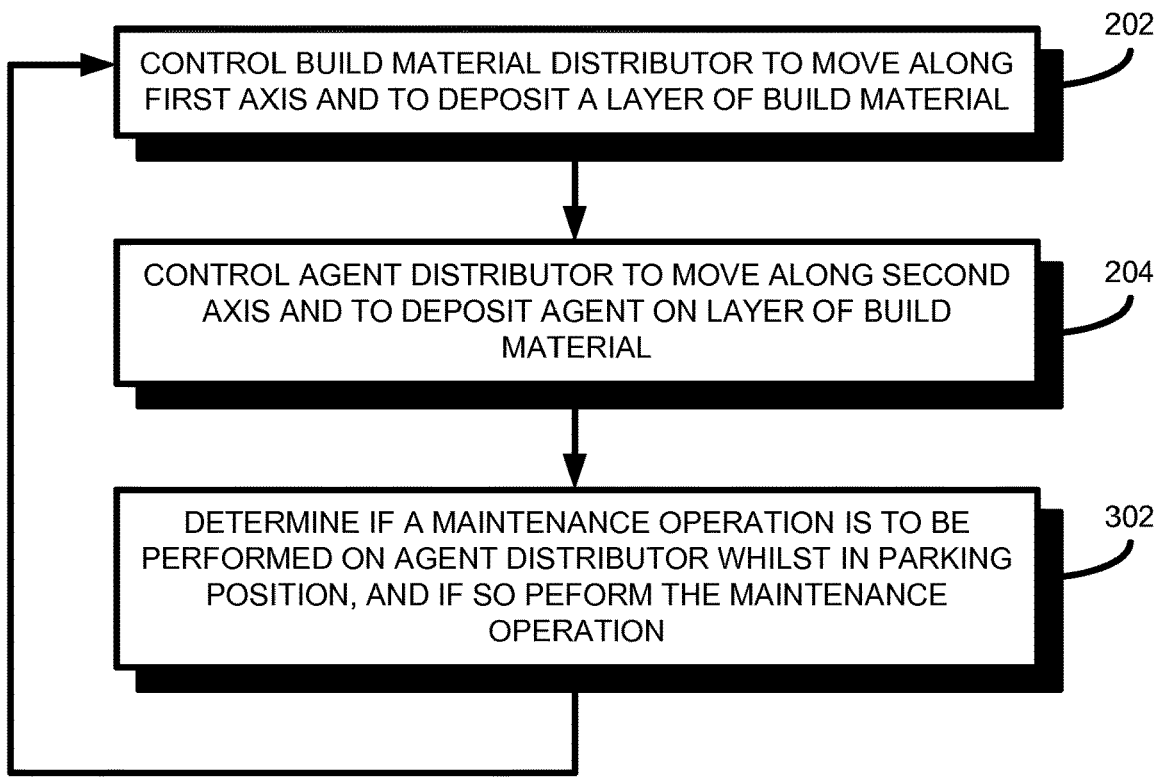
FIG. 3 is a flow diagram outlining a method of controlling an additive manufacturing system according to one example.

A further example method of operating the system 100 of FIG. 1 to generate a three-dimensional object will now be described with additional reference to the flow diagram of FIG. 3.

In this method, once the controller 112 has controlled the system 100 to perform blocks 202 and 204 as described above, the controller 112 determines at block 302 if a maintenance operation is to be performed on the agent distributor 106 whilst it is positioned in the parking position. If the controller 112 does determine that a maintenance operation is to be performed the controller 112 controls elements of the system 100 to perform the maintenance operation. In one example the controller 112 may control the agent distributor to perform a spit or purge into a spittoon located below the parking position. In another example the controller 112 may control an agent distributor service station (not shown) to perform a maintenance operation on the agent distributor 106.

Figure 4:
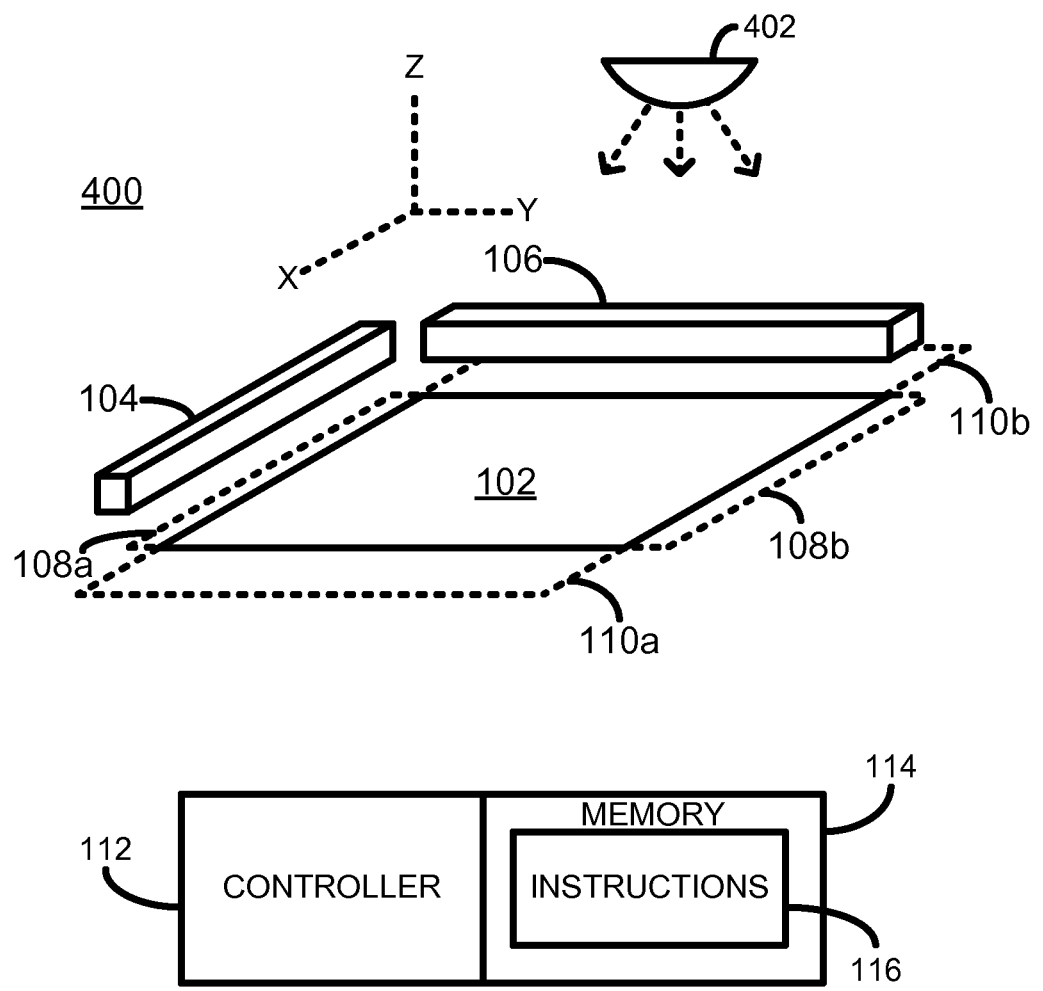
FIG. 4 is a simplified isometric illustration of a portion of an additive manufacturing system according to one example.

Referring now to FIG. 4, there is shown a simplified isometric illustration of a portion of an additive manufacturing system 400 according to one example. In this example the agent distributor 106 may selectively deliver drops of a liquid coalescing agent or energy absorber to one or multiple portions of a layer of build material.

The system 400 additionally includes an energy source 402 to apply energy to build material to cause the solidification of portions of the build material according to where agent has been delivered or has penetrated. In one example the energy source 402 is an infra-red (IR) or near infra-red light source. In one example the energy source 402 may be a single energy source that is able to uniformly apply energy to successive layers of build material deposited on the support 102. In some examples the energy source 402 may comprise an array of energy sources.

The temporary application of energy may cause portions of the build material on which coalescing agent has been delivered or has penetrated to heat up above the melting point of the build material and to coalesce. Upon cooling, the portions which have coalesced become solid and form part of the three-dimensional object being generated. According to one non-limiting example, a suitable coalescing agent may be an ink-type formulation comprising carbon black, such as, for example, the ink formulation commercially known as CM997A available from Hewlett-Packard Company. In one example such an ink may additionally comprise an infra-red light absorber. In one example such an ink may additionally comprise a near infra-red light absorber. In one example such an ink may additionally comprise a visible light absorber. Examples of inks comprising visible light enhancers are dye based colored ink and pigment based colored ink, such as inks commercially known as CE039A and CE042A available from Hewlett-Packard Company.

In some examples the energy source 402 is configured to apply energy in a substantially uniform manner to the whole surface of a layer of build material. In these examples the energy source 402 may be said to be an unfocused energy source. In these examples a whole layer may have energy applied thereto simultaneously, which may help increase the speed at which a three-dimensional object may be generated.

In one example the build material distributor 104 may be positioned in a parking position whilst energy is applied to build material. In one example the agent distributor 106 may be positioned in a parking position whilst energy is applied to build material. In one example a maintenance operation may be performed on the agent distributor 106 whilst energy is being applied to build material.

Figure 5:
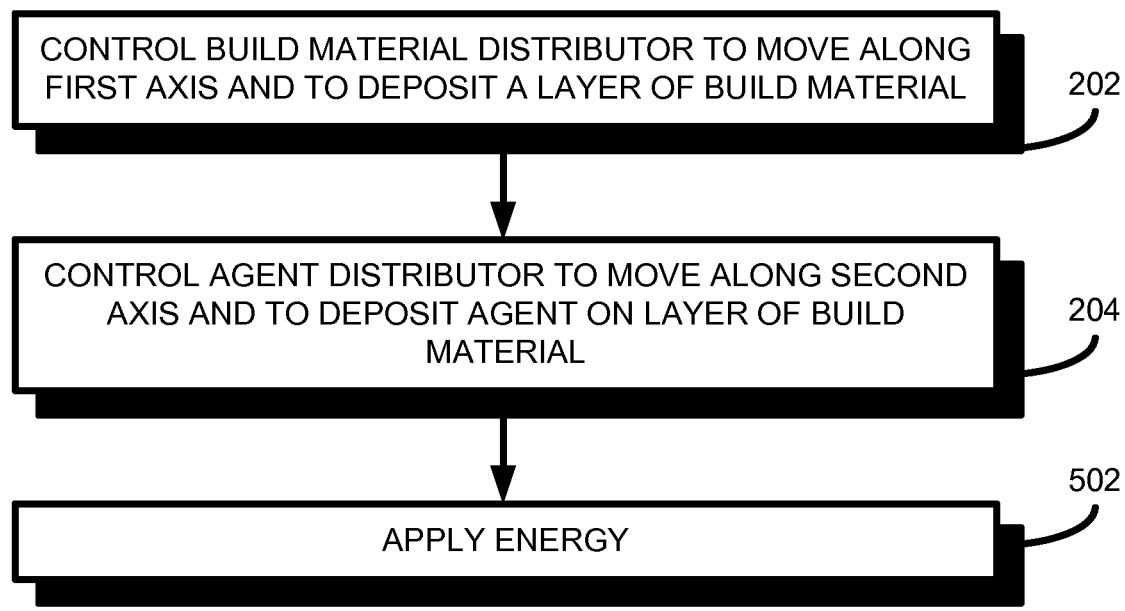
FIG. 5 is a flow diagram outlining a method of controlling an additive manufacturing system according to one example.

An example method of operating the system 400 of FIG. 4 to generate a three-dimensional object will now be described with additional reference to the flow diagram of FIG. 5.

In this method, once the controller 112 has controlled the system 100 to perform blocks 202 and 204 as described above, the controller 112 controls at block 502, the energy source 402 to apply energy to build material to cause portions of the build material on which agent has been delivered to coalesce and to solidify.

In a further example, the controller 112 may additionally control the system 400 to determine, as previously described above with reference to block 302 of FIG. 3, if a maintenance operation is to be performed on the agent distributor 106 whilst it is positioned in the parking position. If the controller 112 does determine that a maintenance operation is to be performed the controller 112 controls elements of the system 400 to perform the maintenance operation.

Figure 6:
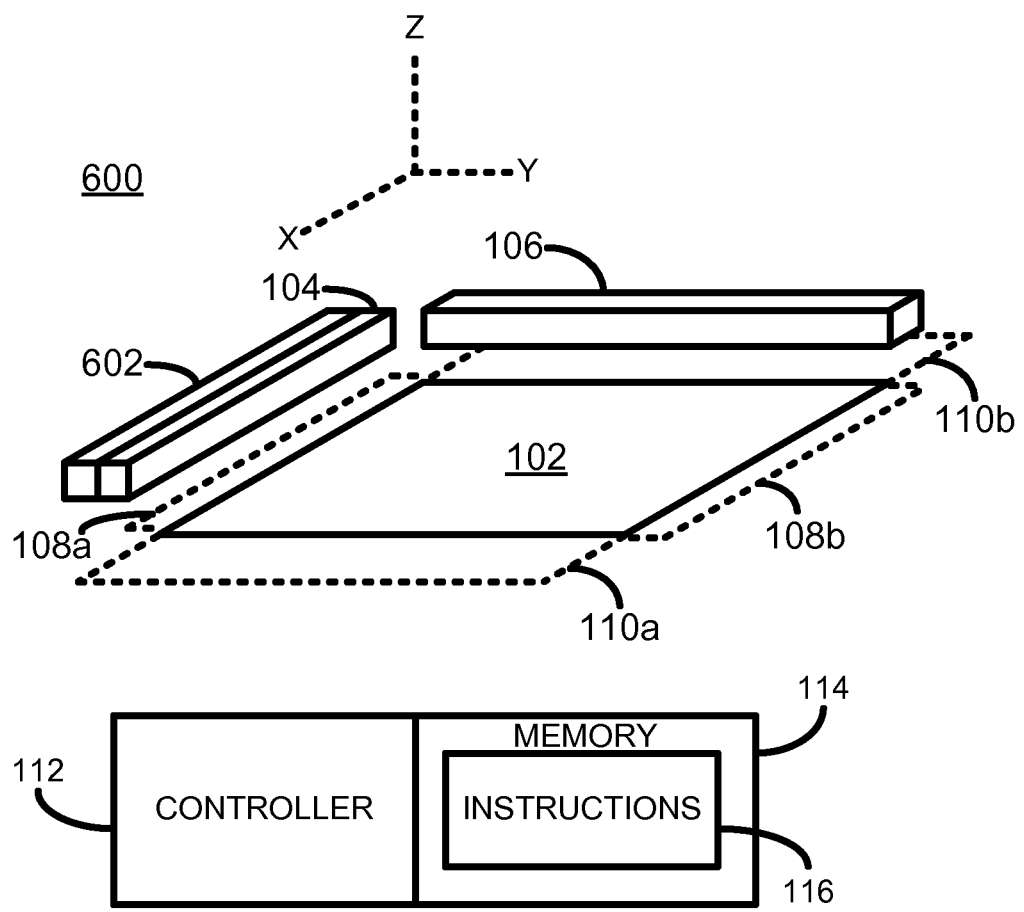
FIG. 6 is a simplified isometric illustration of a portion of an additive manufacturing system according to one example.

Referring now to FIG. 6, there is shown a simplified isometric illustration of a portion of an additive manufacturing system 600 according to a further example. In this example the agent distributor 106 may selectively deliver drops of a liquid coalescing agent or energy absorber to one or multiple portions of a layer of build material.

In this example an energy source 602 is provided that is movable bi-directionally along the y-axis such that it may apply energy to a portion of a layer of build material whilst moving in either direction. In the example shown the energy source 602 is mounted in proximity to the build material distributor 104. In one example the energy source 602 and build material distributor 104 may be mounted on the same movable carriage or gantry (not shown).

The energy source 602 may be any suitable energy source to cause the solidification of portions of the build material according to where agent has been delivered or has penetrated. In one example the energy source 602 is an infra-red (IR) or near infra-red light source. In one example the energy source 602 may be a single energy source that is able to uniformly, or substantially uniformly, apply energy to build material deposited on the support 102. In some examples the energy source 602 may comprise an array of energy sources.

The energy source 602 may apply energy to a strip of a layer of build material such that as the energy source 602 is moved across the support 102 it applies sufficient energy across a layer of build material to cause portions of the build material on which agent has been delivered to coalesce and to solidify. When moving in one direction across the support 102 the energy source 602 may apply energy to build material on which agent has been delivered, whilst the build material distributor 104 deposited a new layer of build material atop the layer of build material to which energy has been applied.

Figure 7:
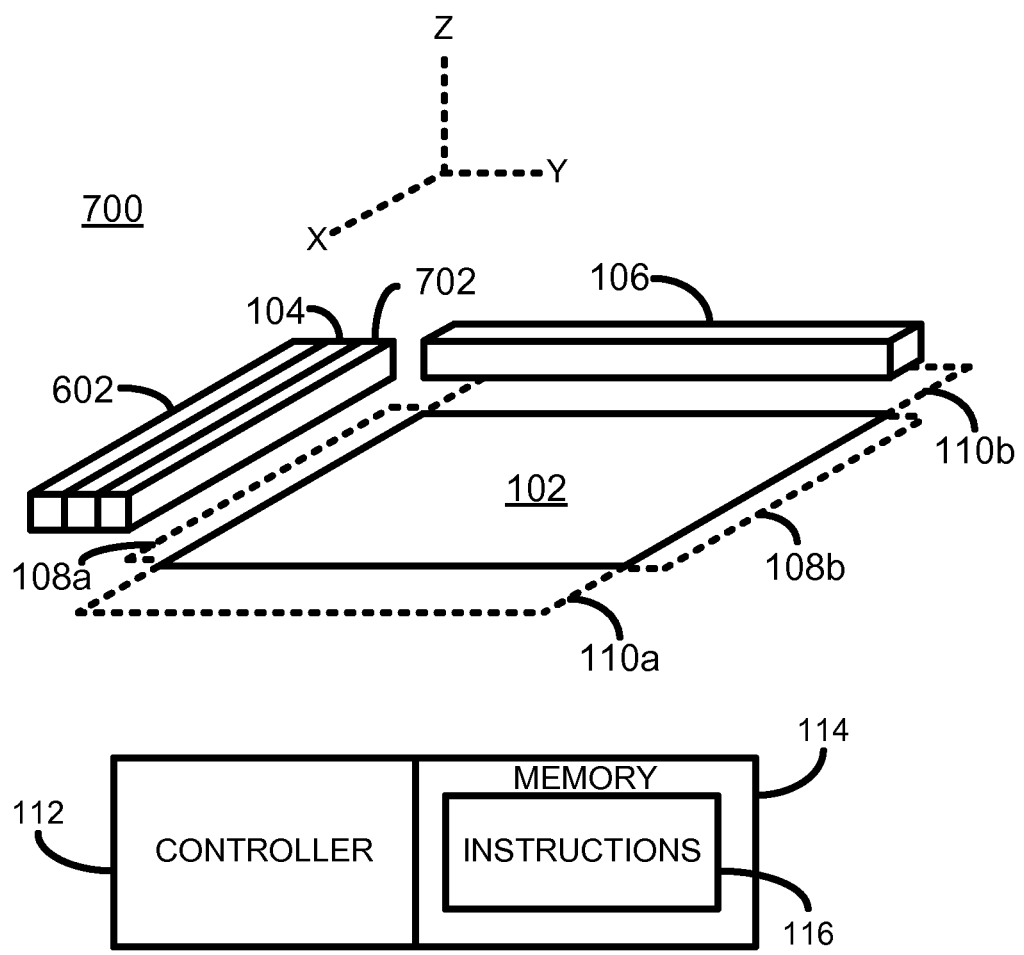
FIG. 7 is a simplified isometric illustration of a portion of an additive manufacturing system according to one example.

Referring now to FIG. 7, there is shown a simplified isometric illustration of a portion of an additive manufacturing system 700 according to a further example. In this example an additional energy source 702 is provided such that the build material distributor 104 has on one side along the y-axis an energy source 602, and on the other side along the y-axis has an energy source 702.

Providing an energy source on either side of the build material distributor enables both a layer of build material to be deposited and energy to be applied to a layer of build material irrespective of the direction in which the elements 104, 602, and 702, are moving. For example, when the if the elements 104, 602, and 702, are moving in one direction, the leading energy source (602 or 702 depending on the direction of travel) may apply energy to a layer of build material on which agent has been delivered whilst the build material distributor 104 is depositing a new layer of build material atop build material to which energy has been applied. In some examples the trailing energy source (602 or 702 depending on the direction of travel) may, for example, not be activated or may be activated to perform a pre-heating function.

Figure 8:
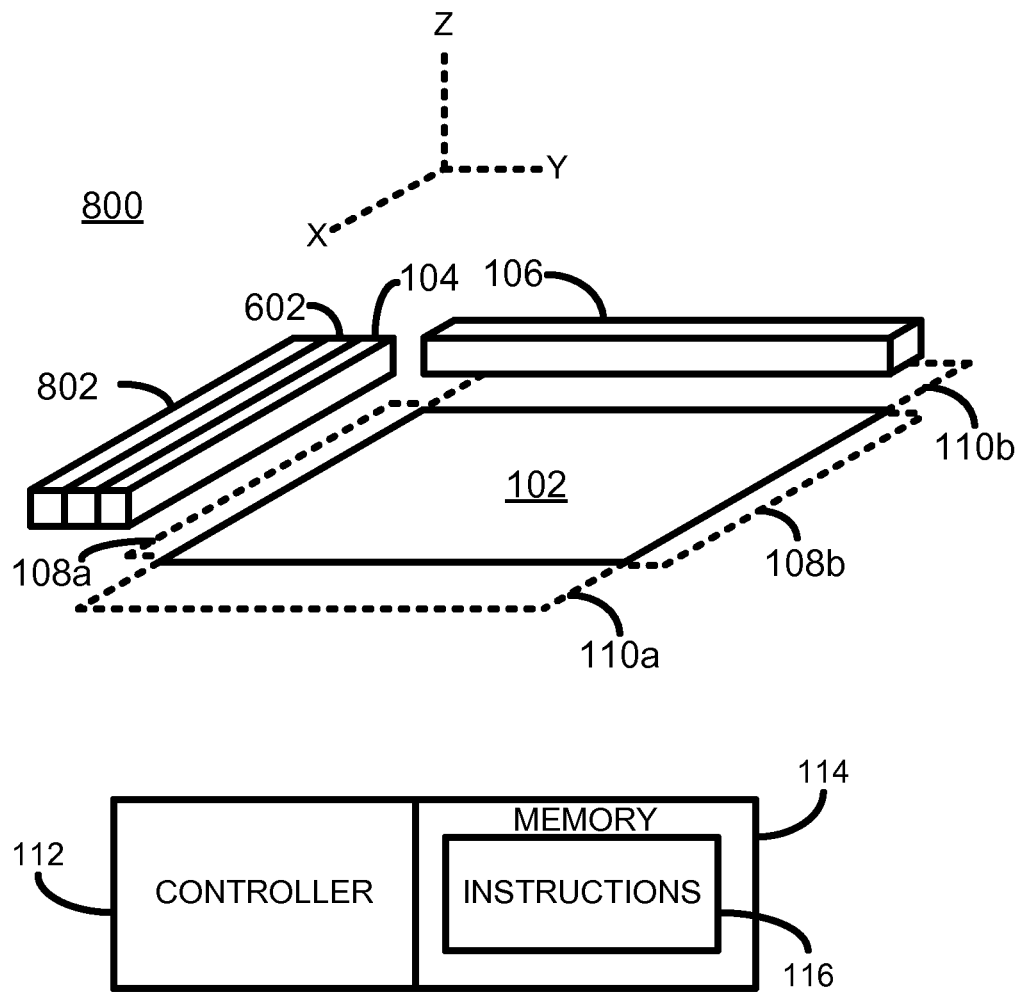
FIG. 8 is a simplified isometric illustration of a portion of an additive manufacturing system according to one example.

Referring now to FIG. 8, there is shown a simplified isometric illustration of a portion of an additive manufacturing system 800 according to a further example. In this example an additional build material distributor 802 is provided in addition to a build material distributor 104 and energy source 602, such that the energy source 602 has on one side along the y-axis the build material distributor 104, and on the other side along the y-axis has the build material distributor 802.

Providing a build material distributor on either side of the energy source enables both a layer of build material to be deposited and energy to be applied to a layer of build material irrespective of the direction in which the elements 104, 602, and 802 are moving. For example, when the elements 104, 602, and 802 are moving in one direction, the energy source 602 may apply energy to a layer of build material on which agent has been delivered whilst the trailing build material distributor (104 or 802 depending on the direction of travel) is depositing a new layer of build material.

Figure 9:
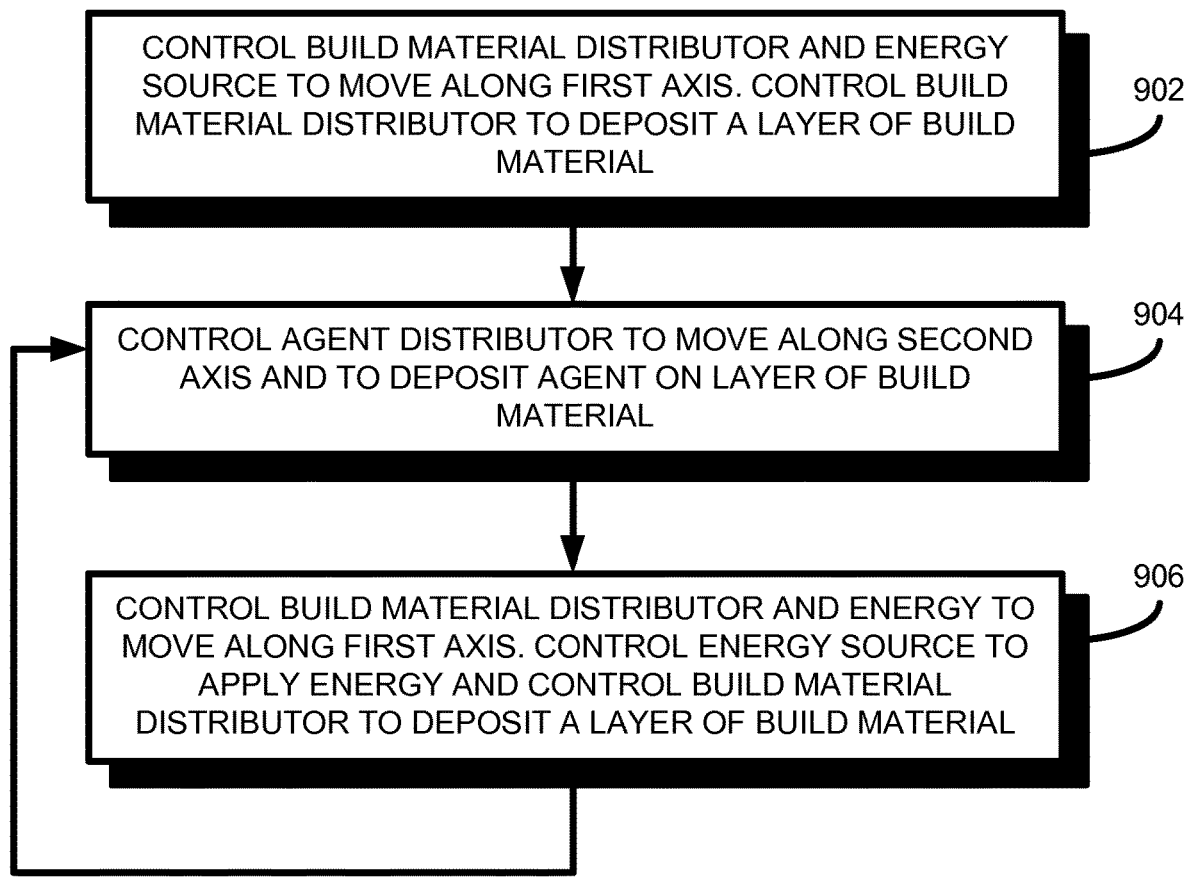
FIG. 9 is a flow diagram outlining a method of controlling an additive manufacturing system according to one example.

An example method of operating the systems 600, 700, or 800 of FIGS. 6, 7, and 8, respectively will now be described with additional reference to the flow diagram of FIG. 9.

At block 902 the controller 112 controls the build material distributor 104 and energy source (602, 702) to move along a first axis (i.e. the y-axis as shown in FIGS. 6, 7, and 8). The controller 112 controls the build material distributor 104 to deposit a layer of build material. The controller 112 controls the build material distributor 104 and energy source (602, 702) to be positioned in a parking position once a layer of build material has been deposited. Where the build material distributor 104 and energy source (602, 702) are mounted on a carriage, the controller 112 indirectly controls the build material distributor 104 and energy source (602, 702) to move along the first axis by controlling the carriage on which it is mounted.

At block 904 the controller 112 controls the agent distributor 106 to move along a second axis (i.e. the x-axis as shown in FIGS. 6, 7, and 8) and to deposit agent on selected portions of the layer of deposited build material. The controller 112 controls the agent distributor 106 to be positioned in a parking position once the agent distributor has delivered agent to selected portions of a layer of build material. Where the agent distributor 106 is mounted on a carriage, the controller 112 indirectly controls the agent distributor 106 to move along the second axis by controlling the carriage on which it is mounted.

At block 906 the controller 112 controls the build material distributor 104 and energy source (602, 702) to move along a first axis (i.e. the y-axis as shown in FIGS. 6, 7, and 8).

In the example shown in FIG. 6, where only a single energy source is provided, the direction of travel may be in the same direction as the direction of travel moved in block 902.

In the example shown in FIG. 7, where two energy sources are provided, the direction of travel may be in the opposite direction to the direction of travel moved in block 902.

The controller 112 controls the energy source, or leading energy source where more than one energy source is present, to apply energy to a layer of build material distributor 104. At the same time the controller 112 controls the build material distributor 104 to deposit a new layer of build material. Again, the controller 112 controls the build material distributor 104 and energy source (602, 702) to be positioned in a parking position once a layer of build material has been deposited.

The controller 112 repeats the blocks 904 and 906 as necessary to generate a three-dimensional object.

In a further example, the controller 112 may additionally control the system (600, 700, 800) to determine, as previously described above with reference to block 302 of FIG. 3, if a maintenance operation is to be performed on the agent distributor 106 whilst it is positioned in the parking position. If the controller 112 does determine that a maintenance operation is to be performed the controller 112 controls elements of the system 400 to perform the maintenance operation as previously described.

Figure 10:
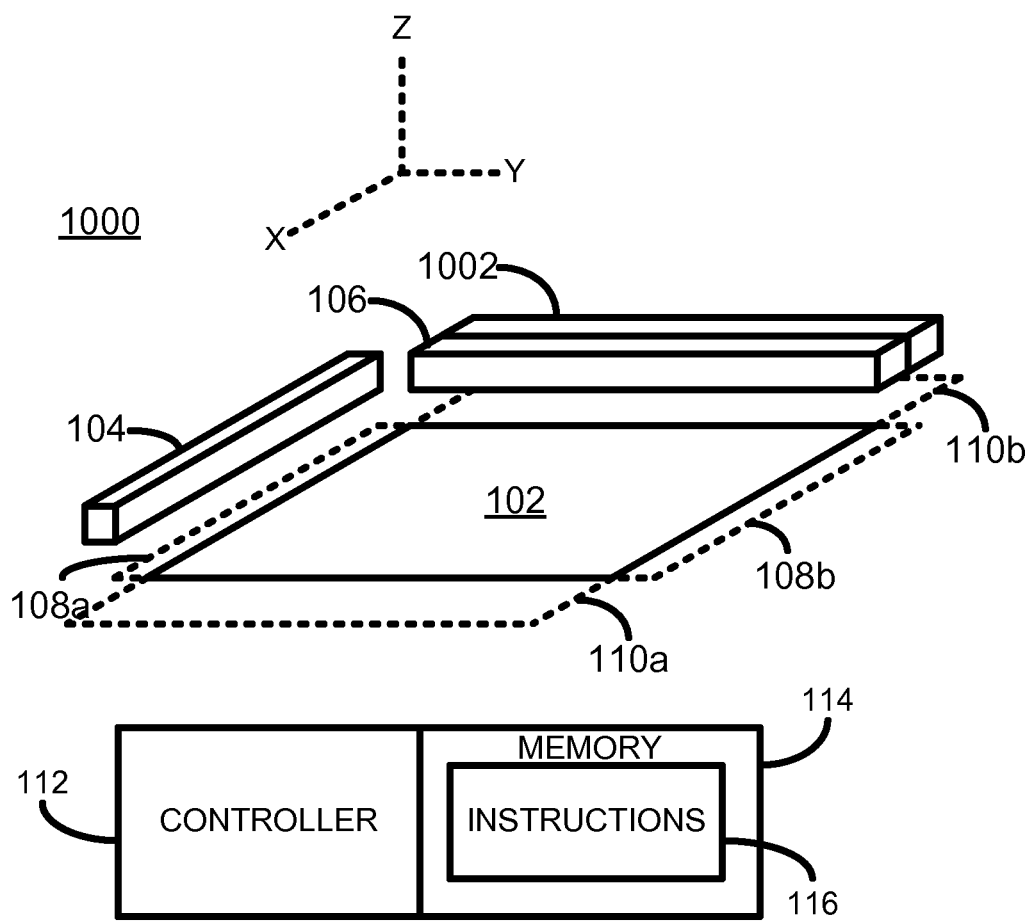
FIG. 10 is a simplified isometric illustration of a portion of an additive manufacturing system according to one example.

Referring now to FIG. 10, there is shown a simplified isometric illustration of a portion of an additive manufacturing system 1000 according to a yet further example. In this example an energy source 1002 is provided that is movable bi-directionally along the x-axis such that it may apply energy to a portion of a layer of build material whilst moving in either direction. In the example shown the energy source 1002 is mounted in proximity to the build agent distributor 106. In one example the energy source 1002 and agent distributor 106 may be mounted on the same movable carriage or gantry (not shown).

Figure 11:
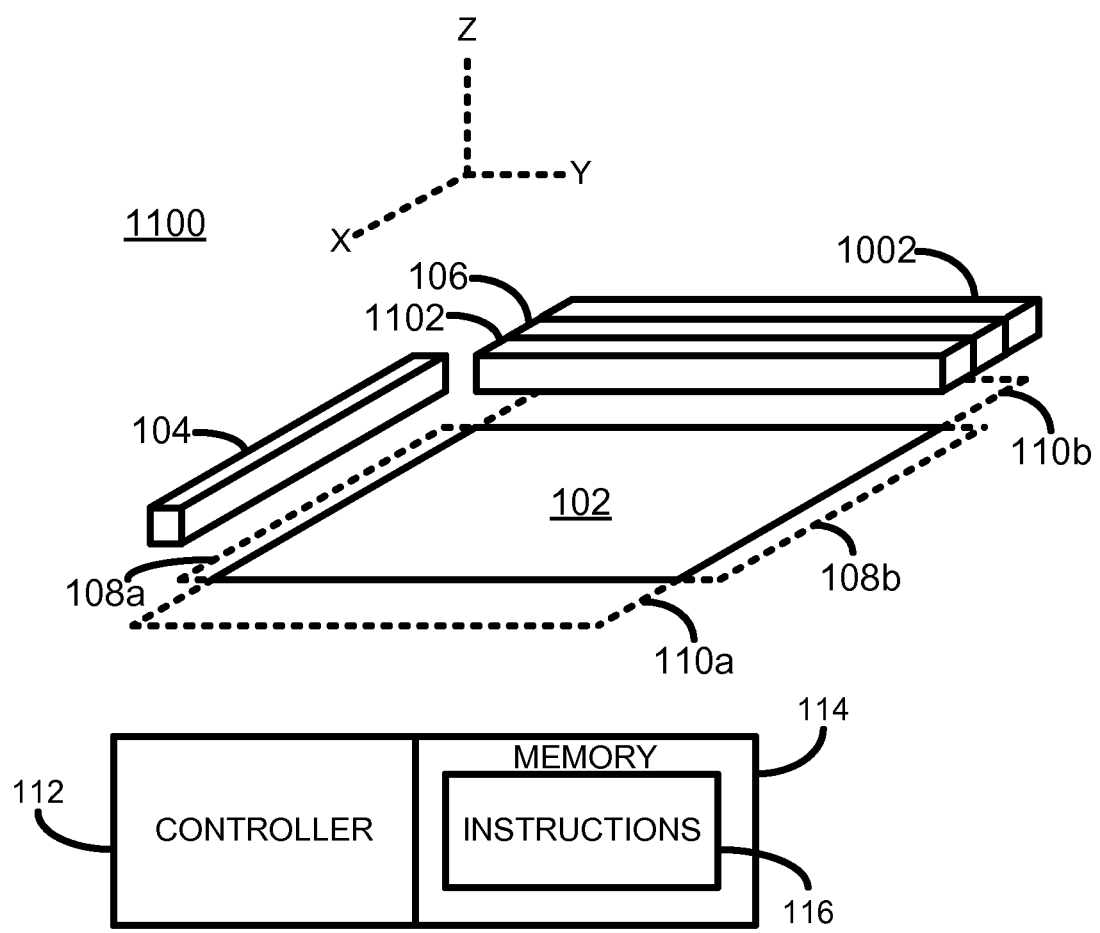
FIG. 11 is a simplified isometric illustration of a portion of an additive manufacturing system according to one example.

Referring now to FIG. 11, there is shown a simplified isometric illustration of a portion of an additive manufacturing system 1100 according to a further example. In this example an additional energy source 1102 is provided such that the agent distributor 104 has on one side along the x-axis an energy source 1002, and on the other side along the x-axis has the energy source 1102.

Providing an energy source on either side of the agent distributor 106 enables agent to be deposited to selective portions of a layer of build material whilst energy is applied thereto, irrespective of the direction in which the elements 106, 1002, and 1102, are moving. For example, if the elements 106, 1002, and 1102, are moving in one direction, the trailing energy source (1002 or 1102 depending on the direction of travel) may apply energy to a layer of build material on which agent has been delivered whilst the agent distributor 106 is delivering agent to selective portions of the layer of build material. In some examples the leading energy source (1002 or 1102 depending on the direction of travel) may, for example, not be activated or may be activated to perform a pre-heating function.

Figure 12:
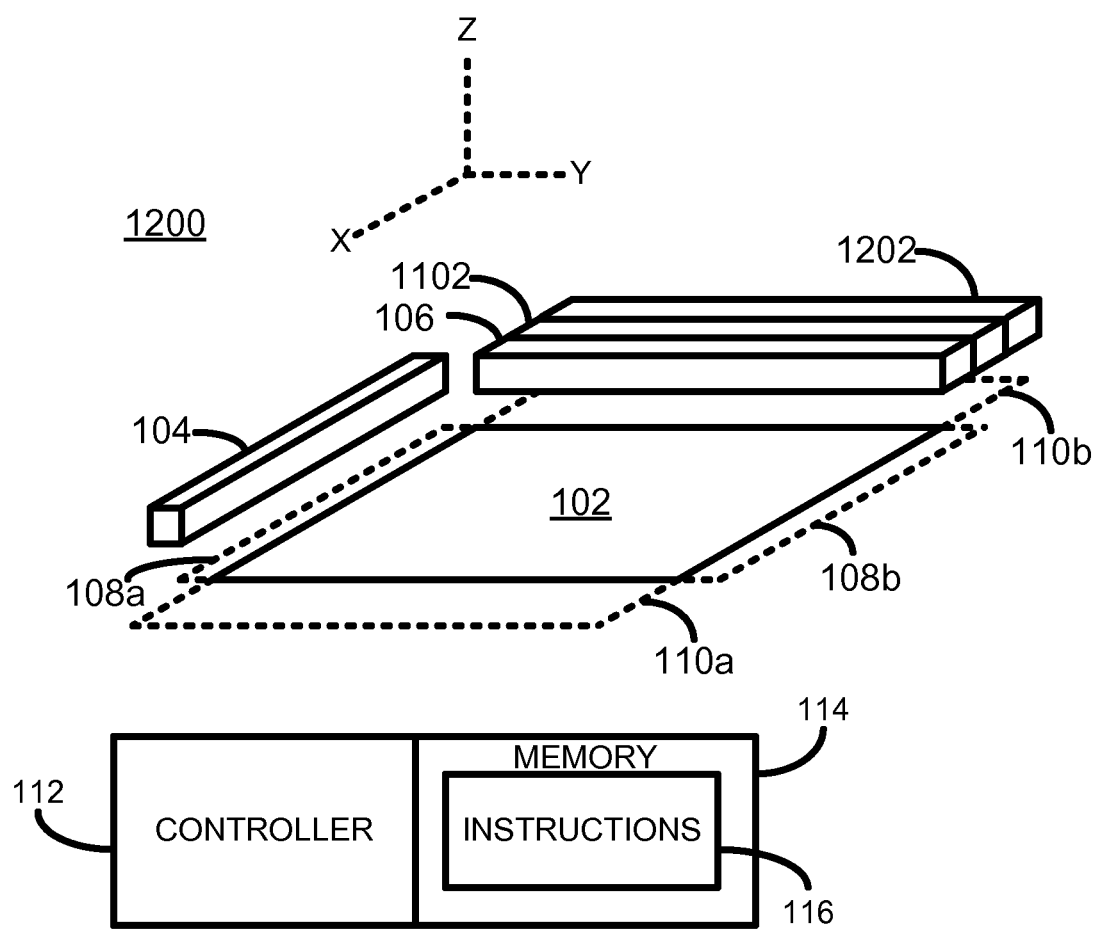
FIG. 12 is a simplified isometric illustration of a portion of an additive manufacturing system according to one example.

Referring now to FIG. 12, there is shown a simplified isometric illustration of a portion of an additive manufacturing system 1200 according to a further example. In this example an additional agent distributor 1202 is provided such that the energy source 1102 has on one side along the x-axis an agent distributor 106 and on the other side along the x-axis has the agent distributor 1202.

Providing an agent distributor on either side of an energy source enables agent to be deposited to selective portions of a layer of build material whilst energy is applied thereto, irrespective of the direction in which the elements 106, 1102, and 1202, are moving. For example, when the if the elements 106, 1102, and 1202, are moving in one direction, the leading agent distributor (106 or 1202 depending on the direction of travel) may deposit agent to selective portions of a layer of build material whilst the energy source 1102 is applying energy to the layer of build material.

Figure 13:
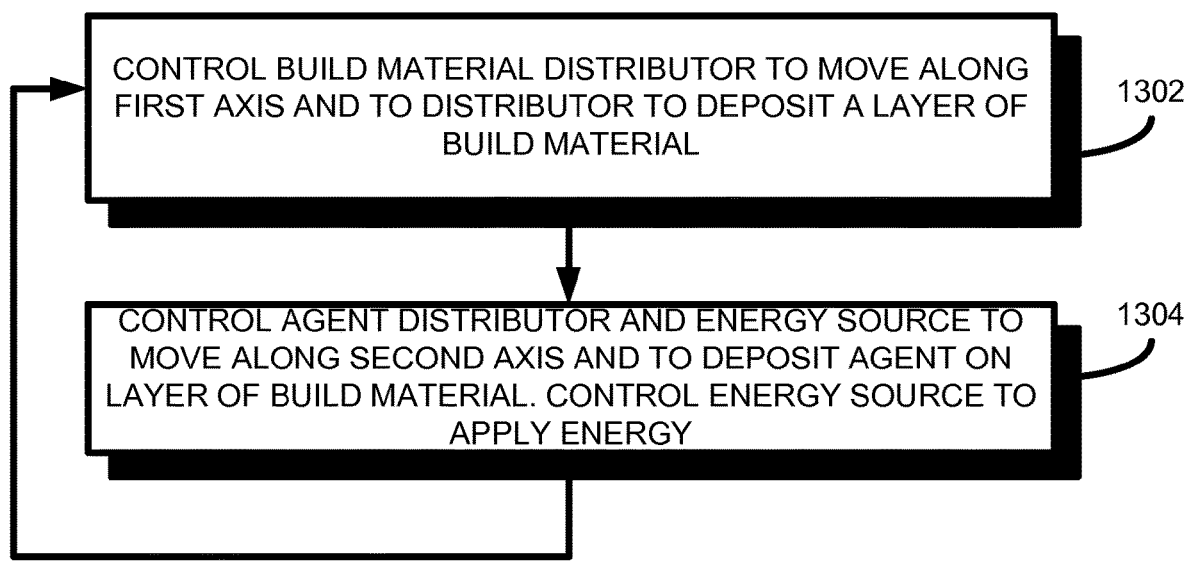
FIG. 13 is a flow diagram outlining a method of controlling an additive manufacturing system according to one example.

An example method of operating the systems 1000, 1100, or 1200 of FIGS. 10, 11, and 12, respectively will now be described with additional reference to the flow diagram of FIG. 13.

At block 1302 the controller 112 controls the build material distributor 104 to move along a first axis (i.e. the y-axis as shown in FIG. 1) and controls the build material distributor 104 to deposit a layer of build material. The controller 112 controls the build material distributor 104 to be positioned in a parking position once a layer of build material has been deposited.

At block 1304 the controller 112 controls the agent distributor 106 and energy source (1002, 1102) to move along a second axis (i.e. the x-axis as shown in FIG. 1). The controller 112 controls the agent distributor 106 to deposit agent on selected portions of the layer of deposited build material.

The controller also controls the energy source (1002 or 1102 depending on the direction of travel) to apply energy to the layer of build material.

In the example shown in FIG. 10, where only a single energy source is provided, the direction of travel may be in the same direction as the direction of travel moved in block 902.

In the examples shown in FIG. 11 or 12, where two energy sources are provided, the direction of travel may be in the opposite direction to the direction of travel moved in block 1302.

At block 1304 the controller 112 controls the energy source, or leading energy source where more than one energy source is present, to apply energy to a layer of build material distributor 104 as the agent distributor 104 106 is depositing agent to selective portions of a layer of build material.

The controller 112 repeats the blocks 1302 and 1304 as necessary to generate a three-dimensional object.

In a further example, the controller 112 may additionally control the system 1000, 1100, or 1200 to determine, as previously described above with reference to block 302 of FIG. 3, if a maintenance operation is to be performed on the agent distributor 106 whilst it is positioned in the parking position. If the controller 112 does determine that a maintenance operation is to be performed the controller 112 controls elements of the system 1000, 1100, and 1200 to perform the maintenance operation, as previously described.

Figure 14:
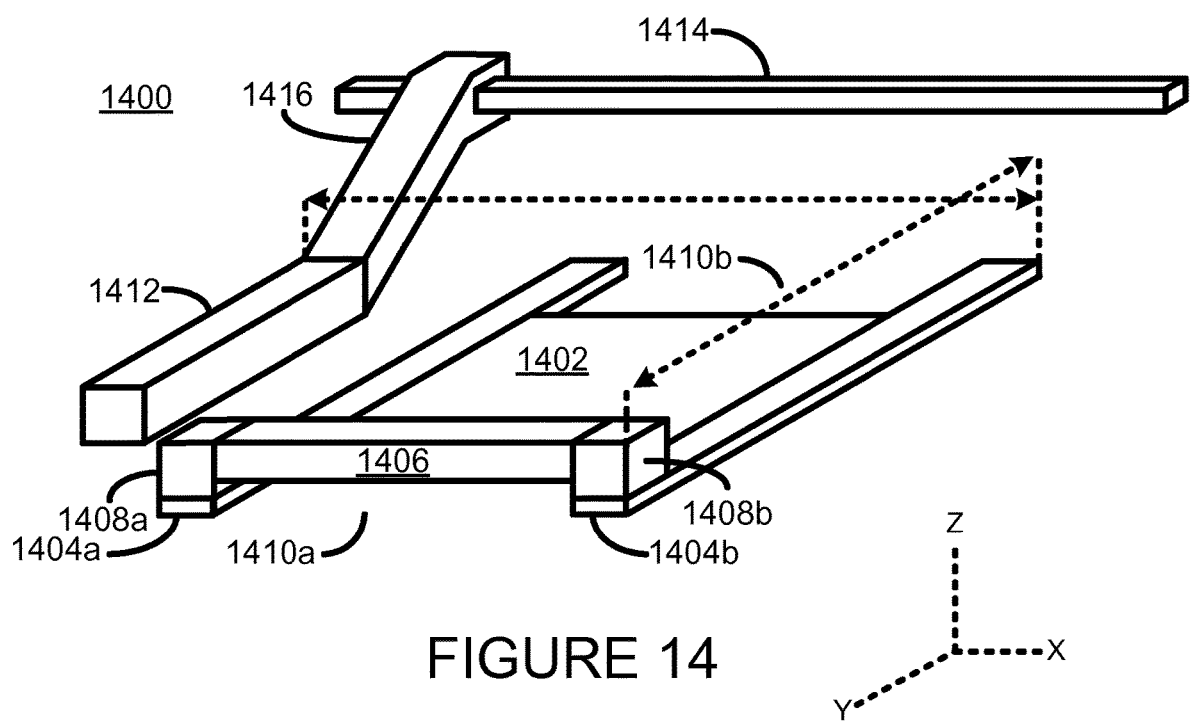
FIG. 14 is a simplified isometric illustration of a portion an additive manufacturing system according to one example.

An example implementation showing how two orthogonal carriages may be arranged in accordance with the description above is illustrated in FIG. 14 which shows a simplified isometric illustration of a portion of an additive manufacturing system 1400 according to one example.

The system 1400 comprises a build material support 1402. The system 1400 further comprises a first carriage assembly to allow an agent distributor 1406, such as a coalescing agent distributor, to move bi-directionally in a first axis (i.e. the y-axis as shown in FIG. 14) from a first parking position 1410*a*, over the build material support 1402, to a second parking position 1410*b*. Whilst moving over the build material support 1402 the agent distributor 1406 may be controlled to deliver agent to selected portions of build material, as previously described.

The first carriage assembly comprises, along opposite edges of the build material support 1402 respective carriage supports 1404*a* and 1404*b*. In one example the carriage supports 1404 may be a rail type structure, although in other examples the carriage supports 1404 may be carriage bars, or other suitable carriage support elements. The agent distributor 1406 is supported on the carriage supports 1404*a* and 1404*b* through respective connecting members 1408*a* and 1408*b*. A suitable drive mechanism may be used to move the connecting members 1408, and hence move the agent distributor 1406, bi-directionally along the y-axis. For example, a motor may be used to direct or indirectly drive the connecting members 1408 under control of a printer controller (not shown).

The system 1400 comprises a second carriage assembly to allow a build material distributor 1412 to move bi-directionally in a second axis (i.e. the x-axis as shown in FIG. 14) from a parking position (not shown) adjacent to one edge of the build material support 1402, over the build material support 1402, to a parking position (not shown) adjacent to the opposite edge of the build material support 1402.

The second carriage mechanism comprises a carriage bar 1414 on which a support arm 1416 is movable bi-directionally. The support arm 1416 is connected to the build material distributor 1412 such that as the support arm 1416 is moved along the carriage bar 1414 the build material distributor is moved over the build material support 1402. A suitable drive mechanism may be used to move the support arm 1416, and hence move the build material distributor 1412, bi-directionally along the x-axis. For example, a motor may be used to direct or indirectly drive the support arm 1416 under control of a printer controller (not shown).

As can be seen from FIG. 14, the second carriage assembly is positioned at a position higher than the first carriage assembly such that, when one of the agent distributor 1406 or build material distributor 1412 are positioned in a respective parking position, the other one of the agent distributor 1046 or build material distributor 1412 may be controlled to move across the build material support 1402 without hindrance.

In other examples other arrangements of first and second carriage mechanisms may be provided.

It will be appreciated that examples described herein can be realized in the form of hardware, or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are example of machine-readable storage that are suitable for storing a program or programs that, when executed, implement examples described herein. Accordingly, examples provide a program comprising code for implementing a system or method as claimed in any preceding claim and a machine readable storage storing such a program.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. Apparatus for generating a three-dimensional object, comprising:
a first carriage movable bi-directionally along a first axis;
a build material distributor mounted on the first carriage to deposit successive layers of a build material on a support;
a second carriage movable bi-directionally along a second axis not parallel to the first axis;
an agent distributor spanning a full width of the support and coupled to the second carriage to deliver an agent onto selected portions of the successive layers of build material; and
an energy source mounted on the first carriage at both sides of the build material distributor, such that as the first carriage is moved along the first axis the energy source is controllable to apply energy to build material on which agent has been deposited whilst the build material distributor is controllable to deposit a new layer of build material.

2. The apparatus of claim 1, wherein the agent distributor is to deliver an agent to cause build material on which it is delivered to form a portion of the three-dimensional object.

3. The apparatus of claim 1, wherein the first axis is orthogonal to the second axis.

4. The apparatus of claim 1, further comprising first and second parking zones adjacent to opposite edges of the support along the first axis at which the build material distributor may be parked without hindering movement of the agent distributor along the second axis.

5. The apparatus of claim 4, further comprising third and fourth parking zones adjacent to opposite edges of the support along the second axis at which the agent distributor may be parked without hindering movement of the build material distributor along the first axis.

6. The apparatus of claim 5, wherein the agent distributor is a printhead, and further comprising an agent distributor service element to enable a servicing operation to be performed on the agent distributor whilst the agent distributor is parked in the third or fourth parking zone.

7. The apparatus of claim 1, further comprising a controller to control the build material distributor, the energy source, and the agent distributor to generate successive layers of a three-dimensional object in accordance with data defining slices of the three-dimensional object to be generated.

8. Apparatus for generating a three-dimensional object, comprising:
a build material distributor movable bi-directionally along a first axis to deposit successive layers of a build material on a support;
an agent distributor spanning a full width of the support and movable bi-directionally along a second axis orthogonal to the first axis to deliver an agent onto selected portions of successive layers of build material;
a first energy source disposed on a first side of the build material distributor and movable with the build material distributor bi-directionally along the first axis;
a second energy source disposed on a second side of the build material distributor and movable with the build material distributor bi-directionally along the first axis; and
a controller to control the build material distributor, the agent distributor, the first energy source, and the second energy source to solidify portions of successive layers of build material in accordance with data defining slices of a three-dimensional object to be generated.

9. The apparatus of claim 8, further comprising a carriage movable along the first axis on which is mounted the build material distributor, the first energy source and the second energy source.

10. The apparatus of claim 9, wherein the controller is to control the carriage to move along the first axis in a first direction, to control the first or second energy source in a leading position in the direction of travel to apply energy to a layer of build material, and to control the build material distributor to deposit a new layer of build material atop the layer of build material to which energy has been applied.

11. The apparatus of claim 10, wherein the agent distributor is to deliver an agent to cause build material on which it is delivered to form a portion of the three-dimensional object upon the application of energy from one or both of the energy sources.

12. The apparatus of claim 11, wherein the agent distributor is a printhead, and further comprising an agent distributor service element to enable a servicing operation to be performed on the agent distributor whilst the agent distributor is parked in a parking zone.

* * * * *